United States Patent

Shimada et al.

[11] Patent Number: 4,756,559
[45] Date of Patent: Jul. 12, 1988

[54] SWIVEL JOINT FOR FLUID PIPES

[75] Inventors: Mitsuhiro Shimada; Keishi Okada; Yushiro Takasugi; Tetsuyuki Hiroe, all of Hiroshima; Susumu Ishibashi, Takasago, all of Japan

[73] Assignees: Japan National Oil Corporation; Mitsubishi Jukogyo Kabushiki Kaisha, both of Tokyo, Japan

[21] Appl. No.: 945,551

[22] Filed: Dec. 23, 1986

[30] Foreign Application Priority Data

Mar. 3, 1986 [JP] Japan .................................. 61-44153

[51] Int. Cl.⁴ ............................................. F16L 39/00
[52] U.S. Cl. .................... 285/136; 285/187; 285/272; 285/332
[58] Field of Search ............... 285/136, 190, 187, 272, 285/332, 334.1, 276, 41

[56] References Cited

U.S. PATENT DOCUMENTS

| | | | |
|---|---|---|---|
| 1,046,600 | 12/1912 | Kahler | 285/187 |
| 4,052,090 | 10/1977 | Stafford | 285/136 |
| 4,111,467 | 9/1978 | de Fremery | 285/136 |
| 4,126,336 | 11/1978 | Ortloff et al. | |
| 4,239,083 | 12/1980 | Silberman et al. | 285/272 |
| 4,280,720 | 7/1981 | Lomenech et al. | 285/136 |
| 4,289,336 | 9/1981 | Bajeux | 285/136 |
| 4,306,741 | 12/1981 | Foolen | |
| 4,405,162 | 9/1983 | Williams | 285/136 |
| 4,598,735 | 7/1986 | Pedersen | 285/190 |
| 4,602,806 | 7/1986 | Saliger | 285/136 |
| 4,647,076 | 3/1987 | Pollack et al. | 285/272 |

FOREIGN PATENT DOCUMENTS

| | | | |
|---|---|---|---|
| 800516 | 11/1950 | Fed. Rep. of Germany | 285/187 |
| 2422097 | 2/1979 | France | |
| 980026 | 1/1965 | United Kingdom | |
| 1326017 | 8/1973 | United Kingdom | 285/187 |
| 588443 | 1/1978 | U.S.S.R. | 285/187 |

Primary Examiner—Randolph A. Reese
Assistant Examiner—Anthony Knight
Attorney, Agent, or Firm—Wenderoth, Lind & Ponack

[57] ABSTRACT

A swivel joint for connecting fluid pipes includes a plurality of elements placed one upon another. Each element includes a cylindrical stationary portion and a cylindrical rotatable portion surrounding the stationary portion and supported rotatably thereon by a pair of vertically spaced apart sliding bearings. The two portions define therebetween an annular fluid passage having a fluid inlet to which a pipe is connected and a fluid outlet to which another pipe is connected. The rotatable portion has a pair of inclined edge surfaces. Each bearing has an inclined edge surface which is complementary to one of the inclined edge surfaces of the rotatable portion and which cooperates therewith to align the axis of rotation of the rotatable portion with the center of the stationary portion. The two portions have therebetween a clearance for absorbing any positional variation by thermal expansion thereof relative to each other.

4 Claims, 4 Drawing Sheets

SWIVEL JOINT FOR FLUID PIPES

BACKGROUND OF THE INVENTION

1. Field of the Invention

This invention relates to a swivel joint for connecting fluid pipes.

2. Description of the Prior Art

There is known a submarine petrolem production system moored at a single point and floating on the surface of the sea in the vicinity of a submarine oil or gas field. The system includes an apparatus for the storage and primary treatment of petroleum or natural gas arriving from the field at the bottom of the sea and a loading and unloading apparatus. The system also includes a plurality of pipelines for transporting petroleum or natural gas having a high temperature and a high pressure from a plurality of pits at the bottom of the sea to the storage apparatus and a plurality of pipelines for supplying a high pressure fluid for service or injection purposes from the treating apparatus to the pits. The system floating on the surface of the sea is caused to swivel about the mooring device by waves, wind and tides. A swivel joint is, therefore, provided at the swiveling center of the system for connecting the pipelines.

A typical swivel joint known in the art is shown in FIGS. 5 and 6. It comprises a plurality of elements 01. Each element 01 comprises a cylindrical rotatable portion 02, a cylindrical stationary portion 03 and a rolling contact bearing 06 which supports the rotatable portion 02 rotatably on the stationary portion 03. The bearing 06 can bear the radial and axial loads. The rotatable and stationary portions 02 and 03 define an annular fluid passage or chamber 04 therebetween. A sealing member 05 is provided between the rotatable and stationary portions 02 and 03. The two elements 01 shown in FIG. 5 are connected one upon the other. The upper element 01 has a fluid inlet 07 and a fluid outlet 08 between which the fluid respective passage 04 extends. Likewise, the lower element 01 has a fluid inlet 07' and a fluid outlet 08' between which the respective fluid passage 04 extends.

The known swivel joint has the following drawbacks that are due to the use of the rolling contact bearings 06:

(1) The rotatable and stationary portions 02 and 03 are heated by the hot fluid flowing through the fluid passage 04. They are thermally expanded and increase their diameters. The bearing 06 is, however, an accurately finished product. If the clearance between the races increases as a result of thermal expansion, the load acting on the bearing 06 is concentrated on some of the rollers and causes them to fracture.

(2) The bearing 06 can bear only the radial and axial loads. It does not respond to the upset moment which is generated when a horizontal load has acted upon the rotatable portion 02.

SUMMARY OF THE INVENTION

It is an object of this invention to provide an improved swivel joint for fluid pipes which can absorb any diametrical variation of the rotatable and stationary portions resulting from their thermal expansion, can respond to any upset moment and can automatically maintain the relative positions of the rotatable and stationary portions.

This object is attained by a swivel joint which comprises a plurality of elements each comprising a cylindrical stationary portion, a cylindrical rotatable portion surrounding the stationary portion and supported rotatably thereon by a pair of vertically spaced apart sliding bearings, the stationary and rotatable portions defining an annular fluid passage therebetween, a fluid inlet pipe connected to one end of the fluid passage and a fluid outlet pipe connected to another end of the fluid passage, the rotatable portion having a plurality of inclined edge surfaces, each of the bearings having an inclined edge surface which is complementary to one of the inclined edge surfaces of the rotatable portion and cooperates therewith to align the axis of rotation of the rotatable portion with the center of the stationary portion, the stationary and rotatable portions defining therebetween a clearance for absorbing any positional variation by thermal expansion of the stationary and rotatable portions relative to each other.

The clearance allows for the diametrical variation of the stationary and rotatable portions resulting from their thermal expansion. The bearings can bear any horizontal load acting on the rotatable portion and thereby resist any resulting upset moment. The inclined edge surfaces of the bearings and the rotatable portion enable the automatic alignment of the rotatable portion with the stationary portion.

DETAILED DESCRIPTION OF THE INVENTION

Figure 1:
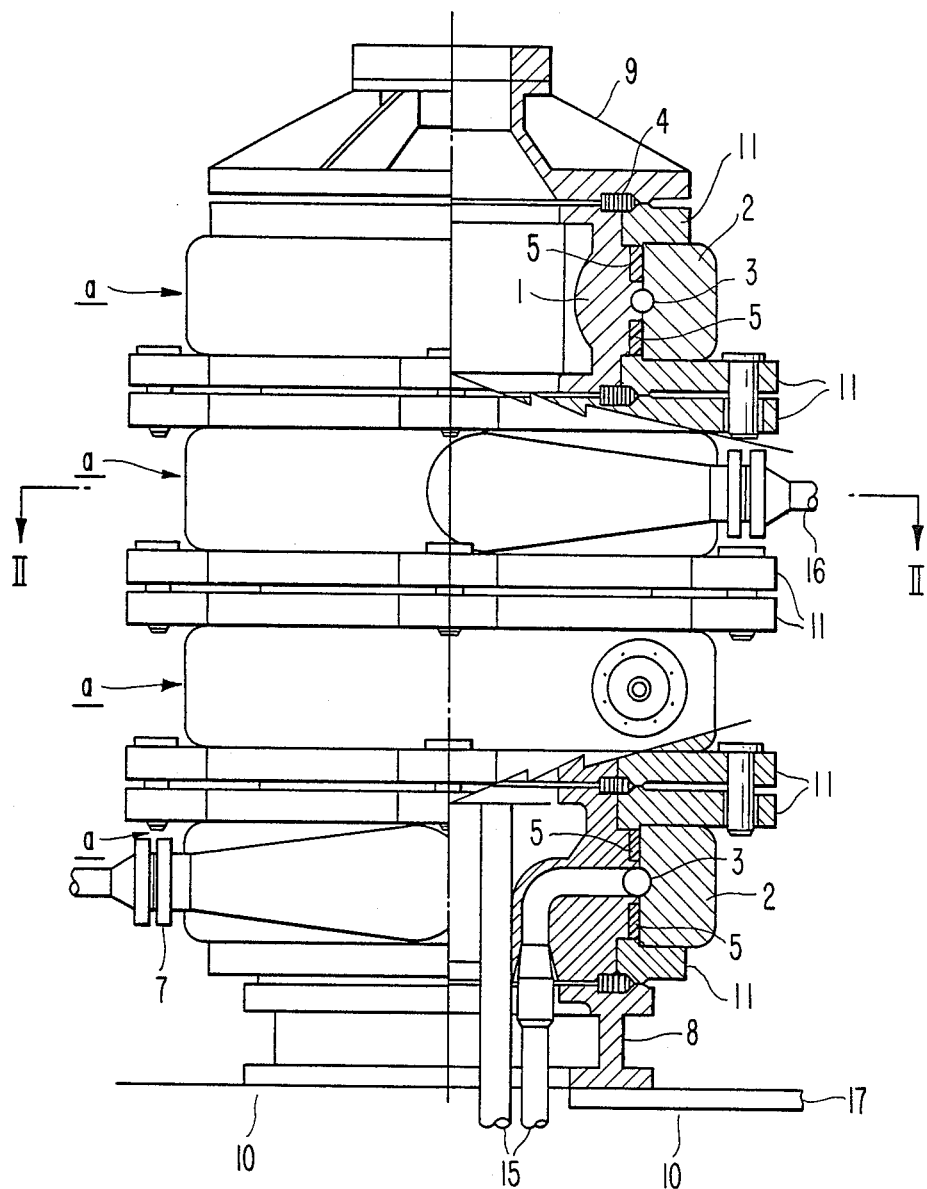
FIG. 1 is a side elevational view, partly in section, of a swivel joint embodying this invention.
Figure 2:
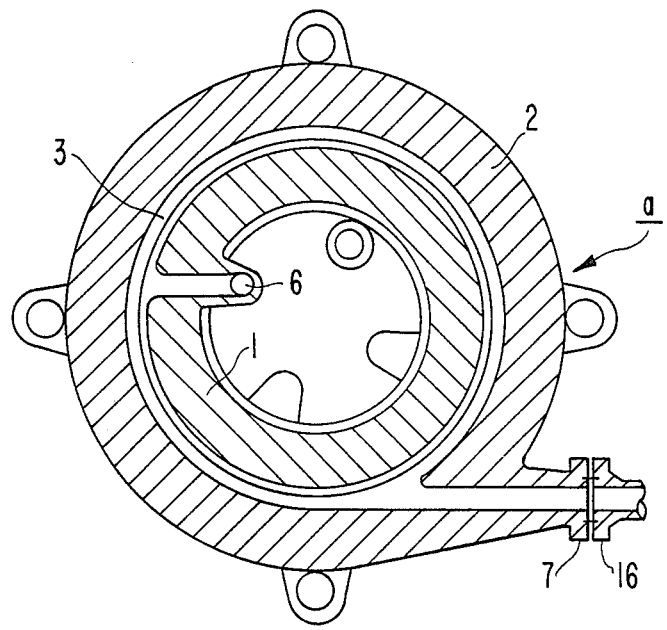
FIG. 2 is a sectional view taken along the line II—II of FIG. 1.
Figure 3:
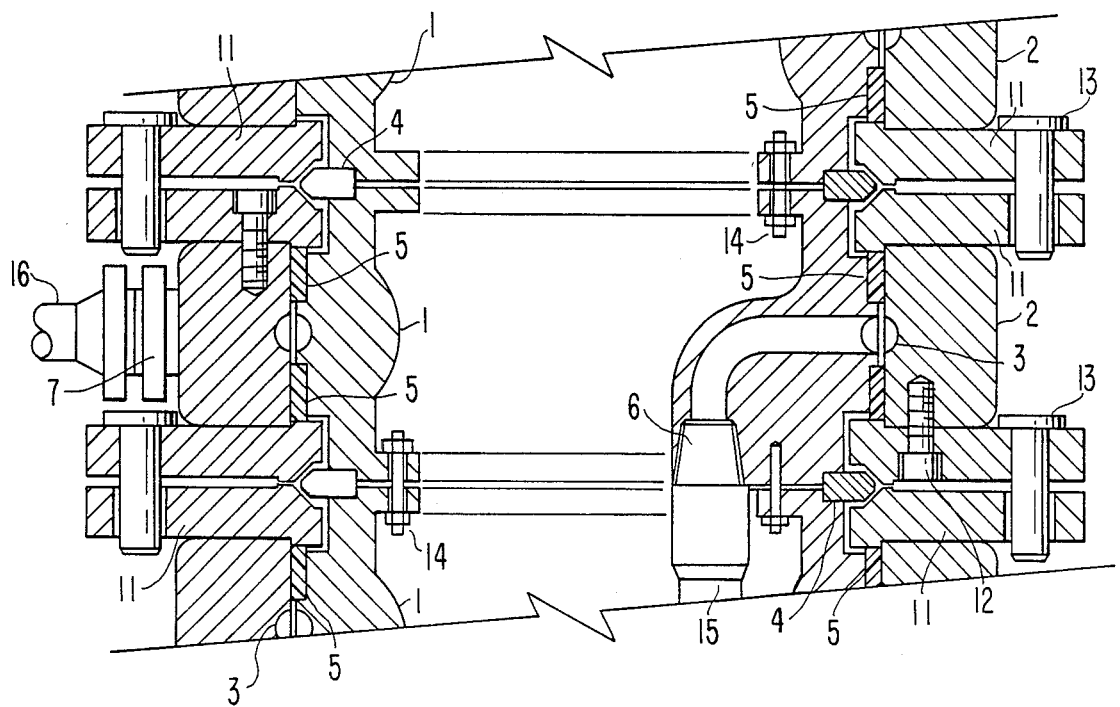
FIG. 3 is a fragmentary enlarged longitudinal sectional view of the swivel joint shown in FIG. 1.

A swivel joint embodying this invention is shown in FIGS. 1 to 4. It comprises four elements a each having a cylindrical stationary portion 1. The stationary portion 1 of one element a is connected by bolts 14 to the stationary portion 1 of another element. A top cover 9 is secured to the stationary portion 1 of the uppermost element a. The stationary portion 1 of the lowermost element a is secured to a base 8 which is secured to the main body of a mooring device 17. Each element a also includes a cylindrical rotatable portion 2. The stationary and rotatable portions 1 and 2 of each element define an annular fluid passage or chamber 3 therebetween. Two seal holding members 11 are provided on the upper and lower ends, respectively, of the rotatable portion 2 of each element. The two seal holding members 11 located between every two adjoining rotatable portions 2 are connected to each other by pins 13. Each seal holding member 11 holds in position a sealing member 5 disposed between the stationary and rotatable portions 1 and 2. A sliding bearing 4 is provided between the stationary portions 1 of every two adjoining elements a. The uppermost bearing 4 is disposed between the stationary portion 1 of the uppermost element and the cover 9, and the lowermost bearing 4 between the lowermost element and the base 8.

Figure 4:
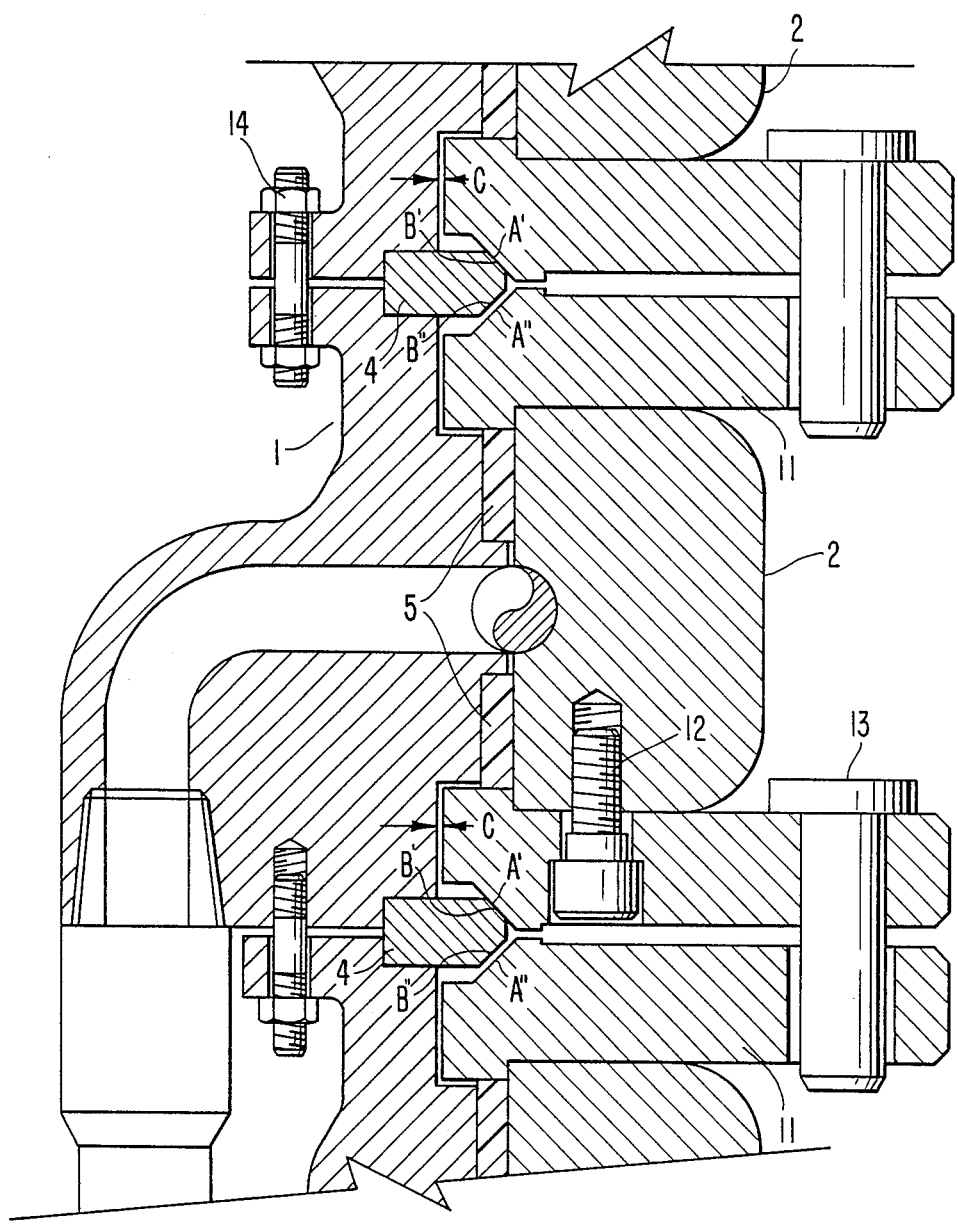
FIG. 4 is a fragmentary enlarged view of the swivel joint shown in FIG. 3.
Figure 5:
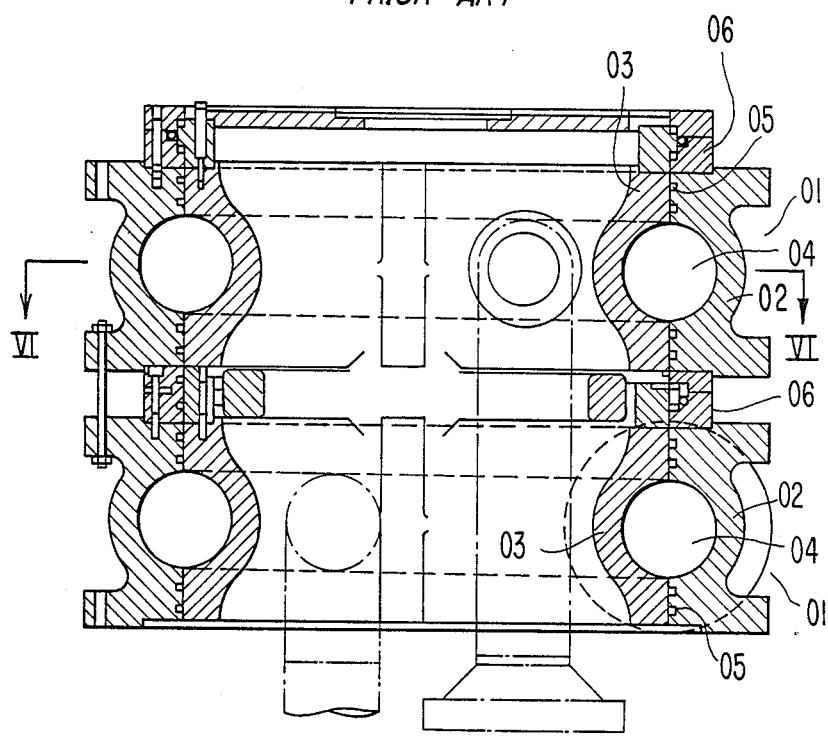
FIG. 5 is a longitudinal sectional view of the known swivel joint which is a sectional view taken along the line V—V of FIG. 6.
Figure 6:
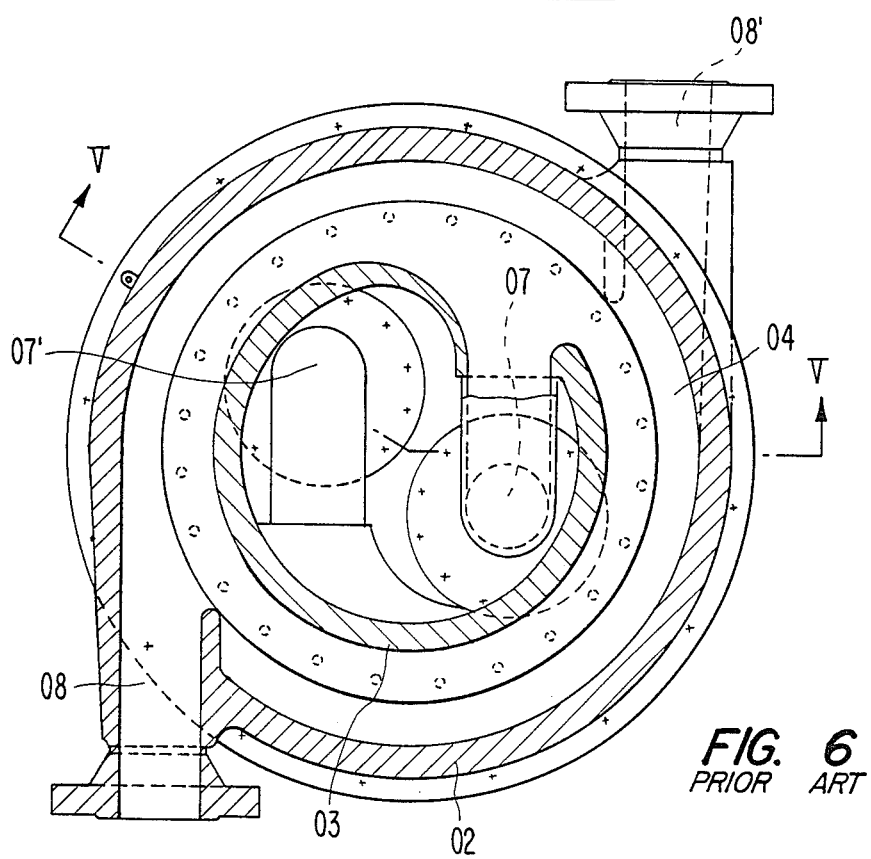
FIG. 6 is a sectional view taken along the line VI—VI of FIG. 5.

Each seal holding member 11 is provided along its inner periphery with an inclined edge surface facing the bearings 4 disposed between every two adjoining elements, or between the uppermost element and the cover 9, or between the lowermost element and the base 8, as shown at A' and A" in FIG. 4. The inclined edge surfaces A' and A" of every two adjoining seal holding members 11 are, therefore, located close to each other. Each bearing 4 has a pair of inclined edge surfaces B' and B" which are vertically spaced apart from each other. Surfaces A', A", B' and B" are frusto-conical, as shown. The inclined edge surface B' of each bearing faces the inclined edge surface A' of one of the seal holding members 11 or a similar surface formed on the cover 9 and is complementary thereto. The inclined edge surface B" of each bearing 4 faces the inclined edge surface A" of one of the seal holding members 11 or a similar surface formed on the base 8 and is complementary thereto. The weight of each rotatable portion 2 is supported on the upper inclined edge surfaces B' of the bearings 4 located therebelow. The bearings 4 are so positioned as to define a clearance C between the stationary and rotatable portions 1 and 2 of each element, as shown in FIG. 4.

Each fluid passage 3 has a fluid inlet 6 to which an inlet pipe 15 is connected, and a fluid outlet 7 to which an outlet pipe 16 is connected.

If the mooring device on which the swivel joint is mounted is moved by waves, wind or tides, a horizontal load acts upon the rotatable portions 2. This load causes the rotatable portions 2 to move along the inclined edge surfaces B' of the bearings 4 toward the stationary portions 1. The upwardly facing inclined edge surfaces A" of the seal holding members 11, however, contact the downwardly facing inclined edge surfaces B" of the bearings 4 before the rotatable portions 2 contact the stationary portions 1. The horizontal load acting upon the rotatable portions 2 is, therefore, borne by the bearings 4. The thermal expansion of the stationary and rotatable portions 1 and 2, which are heated by the hot fluid (i.e., petroleum or natural gas collected from a submarine oil or gas field and having a high temperature and a high pressure) flowing through the fluid passages 3, is effectively absorbed by the clearances C, as the rotatable portions 2 are lifted by the inclined edge surfaces B' of the bearings 4.

While the invention has been described with reference to a preferred embodiment thereof, it is to be understood that modifications or variations may be made by anybody of ordinary skill in the art without departing from the scope of this invention which is defined by the appended claims.

What is claimed is:

1. A swivel joint for connecting fluid pipes comprising a plurality of elements placed one upon another, each of said elements comprising:

a cylindrical stationary portion;
   a cylindrical rotatable portion surrounding said stationary portion and supported rotatably thereon by a pair of vertically spaced apart sliding bearings, said stationary and rotatable portions defining an annular fluid passage therebetween, said passage having a fluid inlet and a fluid outlet;
   a fluid inlet pipe connected to said fluid inlet;
   a fluid outlet pipe connected to said fluid outlet;
   said rotatable portion having a pair of inclined edge surfaces, each of said bearings having an inclined edge surface which is complementary to one of said inclined edge surfaces of said rotatable portion and cooperates therewith to align the axis of rotation of said rotatable portion with the center of said stationary portion, said stationary and rotatable portions having therebetween a clearance for absorbing any positional variation by thermal expansion of said portions relative to each other.

2. A swivel joint as set forth in claim 1, wherein said rotatable portion includes a pair of members for maintaining a fluid-tight seal between said stationary and rotatable portions.

3. A swivel joint as set forth in claim 2, wherein each of said bearings projects from said stationary portion to said rotatable portion to maintain said clearance therebetween.

4. A swivel joint as set forth in claim 1, wherein said inclined edge surfaces of said bearings and of said rotatable portions comprise frusto-conical surfaces.

* * * * *